Patented Sept. 30, 1941

2,257,384

UNITED STATES PATENT OFFICE 2,257,384

CATALYTIC PROCESS

William B. Johnston, Stamford, Conn., assignor to American Cyanamid Company, New York, N. Y., a corporation of Maine No Drawing. Application July 13, 1939, Serial No. 284,243

6 Claims. (Cl. 260—485)

This invention relates to processes of catalyzing the reactions of various organic substances. Stannic chloride and other metallic halides have been proposed for catalyzing a wide variety of reactions between organic compounds. Many of these catalytic materials such as stannic chloride have certain disadvantages. Stannic chloride, for instance, is quite unstable in the anhydrous form and is quite hygroscopic. This salt hydrolyzes very easily and decomposes during storage of relatively short periods of time. Furthermore, stannic chloride is extremely corrosive and is, therefore, difficult to handle and requires many precautions in order to avoid injury to persons handling the same. Stannic chloride also has certain disadvantages from the more technical point of view. Among these is the tendency to produce insoluble, polymerized materials and to cause much discoloration when added to many unsaturated compounds such as terpenes, drying oils, petroleum distillates, etc.

Double compounds of stannic chloride or other metallic halides with an alcohol have many of the same disadvantages and in addition are somewhat difficult to prepare and discolor upon storage.

One object of this invention is to provide catalysts for various organic reactions which catalysts are both stable and easy to handle.

Another object of this invention is to provide a catalyst particularly suited for esterification reactions, e. g., alkyd resin reactions, which will not discolor the reacting materials or the reaction products.

Still another object of this invention is to provide a catalyst which avoids the disadvantages of stannic chloride and which is suitable for effecting the polymerization of polymerizable materials or to effect the interaction of two or more unsaturated substances.

It is also an object of this invention to provide a catalyst which avoids the disadvantages mentioned above and which is suitable for catalyzing the chlorination of hydrocarbons.

These and other objects of the invention which will be more apparent from the description are attained by the use of a metallic halide dioxanate as the catalytic material. More specifically stannic chloride dioxanate is used as a catalytic material. The following examples are given by way of illustration and not in limitation.

EXAMPLE 1

Preparation of stannic chloride dioxanate

|   | Parts by weight |
|---|---|
| Anhydrous stannic chloride | 26 |
| Dioxane | 118 |

The stannic chloride is added to the dioxane. The complex, stannic chloride dioxanate precipitates as a fine white solid which is stable at ordinary room temperatures. The substance is not hydroscopic nor strongly corrosive as in the case of the stannic chloride itself. It is, therefore, easily handled and may be stored for long periods of time with good stability.

EXAMPLE 2

|   | Parts by weight |
|---|---|
| Fumaric acid | 232 |
| Butanol | 416 |
| Stannic chloride dioxanate | 5.4 |
| Toluene | 100 |

These substances are reacted azeotropically, the toluene being an inert diluent to assist in effecting the azeotropic distillation and removal of the water of reaction. The water formed during the reaction is separated from the reflux distillate in a suitable trap. The mixture is refluxed for about twelve hours and the toluene is then removed by distillation leaving a residue containing dibutyl fumarate. Upon distillation there is obtained dibutyl fumarate, a water-white liquid which distills at about 110°–111° C. at about 1–2 mm. (of mercury) pressure. The ester has a saponification number of about 488.

EXAMPLE 3

|   | Parts by weight |
|---|---|
| Dibutyl fumarate | 114 |
| Dipentene | 103 |
| Stannic chloride dioxanate | 1.35 |

This mixture is placed in a reaction chamber provided with an agitator and a reflux condenser. The mixture is refluxed for about fourteen hours and the resulting product distilled under vacuum at about 1–2 mm. pressure and at about 160°–180° C. A light-colored, viscous complex ester of relatively low acid number is obtained.

Example 4

| | Parts by weight |
|---|---|
| Fumaric acid | 116 |
| Triethylene glycol | 142 |
| Glycerol | 4 |
| Beta pinene | 170 |
| Stannic chloride dioxanate | 3 |

A mixture containing these ingredients is heated to 180° C. in about one hour in a suitable reaction chamber provided with an agitator, to 210° C. in about another two hours, and to 230° C. in about a half hour. The resulting resinous ester has an acid number of about 13–19. About 1 mol of terpene combines (with the polyhydric alcohol and fumaric acid) per mol of fumaric acid.

Example 5

| | Parts by weight |
|---|---|
| Menhaden oil | 440 |
| Maleic anhydride | 50 |
| Stannic chloride dioxanate | 1 |

This composition is heated at 180°–260° C. for one to three hours preferably under an atmosphere of carbon dioxide. A dark, viscous product is obtained, films of solutions of which dry upon baking one half to one hour at about 110° C.

Example 6

| | Parts by weight |
|---|---|
| Linseed oil | 293 |
| Maleic anhydride | 98 |
| Stannic chloride dioxanate | 2 |

This mixture is placed in a reaction chamber provided with an agitator and is heated at about 200° C. for about one to three hours. A clear, amber-colored product which is soluble in ammonium hydroxide is obtained.

Other metallic halides in the form of the complex dioxanate salts which may be used as catalysts in carrying out various reactions such as those set forth above include: aluminum chloride, zinc chloride, ferric chloride and the corresponding iodides, bromides and fluorides.

Dioxanates of the metallic halides may be used in a wide variety of chemical reactions. They are particularly suitable for esterifications and especially in the production of polyester resins. They are also suitable for the reaction of an alpha, beta-unsaturated carboxylic acid with: a non-conjugated unsaturated fatty oil, a non-conjugated unsaturated fatty acid, a non-conjugated unsaturated fatty acid ester, a terpene hydrocarbon of the $C_{10}H_{16}$ series (especially the non-conjugated terpenes), a mixture of such terpenes and an alcohol, etc. These catalysts are also suitable for effecting the condensation of ethylene oxide with alcoholic materials e. g. monohydric alcohols, glycols, glycerol, etc.

The dioxanates of metallic halides may also be used for polymerizing dienes and other unsaturated compounds such as terpenes, cumarone, styrene, methyl styrene, indene, cinnamal-indene, cinnamal-fluorene and cyclopentadiene, preferably with a polymerization temperature of about 130°–210° C. These catalysts are also suitable for chlorinating hydrocarbons such as cyclohexane. These catalytic materials may also be used in cracking and in polymerizing petroleum products.

Obviously many modifications and variations in the processes described above may be made without departing from the spirit and scope of the invention as defined in the appended claims.

I claim:

1. A process which comprises reacting, in the presence of a dioxanate of a metal halide as a catalyst, organic substances, the reaction of which is catalyzed by the same metal halide.

2. A process which comprises reacting, in the presence of stannic chloride dioxanate as a catalyst, organic substances, the reaction of which is catalyzed by stannic chloride.

3. A process which comprises polymerizing unsaturated organic substances in the presence of stannic chloride dioxanate as a catalytic agent.

4. A process which comprises reacting an alcohol and a carboxylic acid in the presence of stannic chloride dioxanate as a catalyst.

5. A process which comprises catalyzing the polymerization of at least two different unsaturated, organic compounds with stannic chloride dioxanate.

6. A process which comprises esterifying fumaric acid and butanol in the presence of stannic chloride dioxanate as a catalytic material.

WILLIAM B. JOHNSTON.